UNITED STATES PATENT OFFICE.

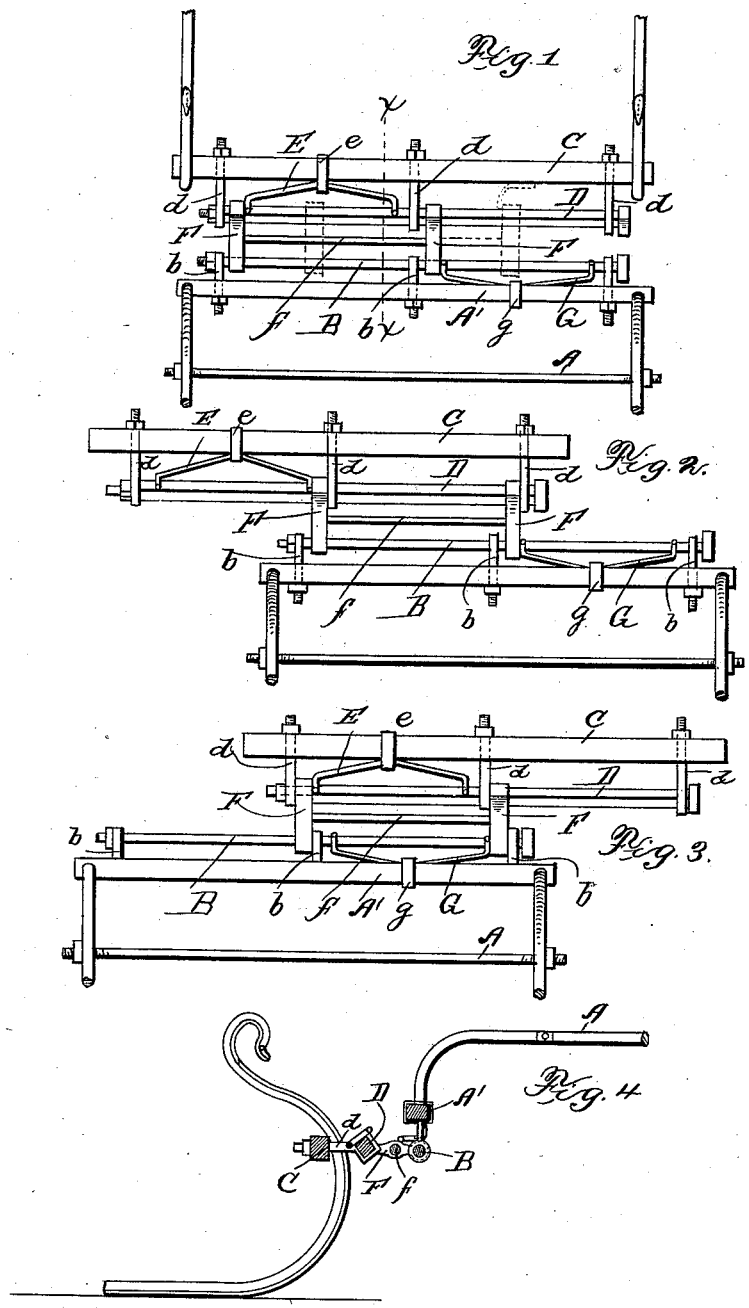

JAMES G. RICHARDSON, OF LAKE CITY, MINNESOTA.

SHIFTING THILL.

SPECIFICATION forming part of Letters Patent No. 358,221, dated February 22, 1887.

Application filed December 8, 1886. Serial No. 221,005. (No model.)

*To all whom it may concern:*

Be it known that I, JAMES G. RICHARDSON, a citizen of the United States, residing at Lake City, in the county of Wabasha and State of Minnesota, have invented certain new and useful Improvements in Shifting Thills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to shifting thills for sleighs and cutters, which can be adjusted to the extreme right or left, or intermediately between these points, so that the horse can travel in the same track in going and returning, or can travel on either side of a track in going but one way, as found most convenient, to obviate the necessity of the horse traveling in the loose snow, which on country roads is often blown into one or the other track.

The object of the invention is to provide simple, convenient, and efficient means for accomplishing the above-named results in an economical, expeditious, and accurate manner.

The invention consists in the novel features presently to be described and claimed, and shown in the annexed drawings, in which—

Figure 1 is a plan view of a shifting thill embodying my improvements. Fig. 2 is a similar view showing the thill adjusted to the extreme right. Fig. 3 is a view similar to Fig. 1, showing the thill adjusted to the extreme left. Fig. 4 is a cross section on the line *x x* of Fig. 1.

The thills A, which may be of any approved form, have the rear end provided with a cross-bar, A', to which the rod B is connected by the eyebolts *b*. The rod B extends parallel with the cross-bar A', and a space intervenes between the bar and rod, as shown, for the purpose hereinafter to be made known.

C is the front bar of the cutter or sleigh, and the rod D is secured thereto by the eyebolts *d* in such manner that a space is left between it and the bar.

The coupling-slides F unite the thill and cutter, and are apertured at each end to receive the rods B and D, which pass loosely through said apertured ends. The rod D is angular-shaped in cross-section, and the apertures in the sliding couplings are of corresponding shape, to prevent them swinging upon the bar D, which obviates the whipping up and down of the rear end of the thill. The couplings are connected by the rod *f*, which holds them at a fixed relative distance apart, and forms, in effect, but one coupling, which extends about only half the distance between the ends of the rods B and D, and can be adjusted to any point intermediate said ends. It is preferably located at one end or the other, and is held in either position by catches, the spring-catches E and G being best adapted for the purpose. The spring-catch E is secured to the bar C near one end by the clip *e*, and the spring-catch G is secured to the bar A' near the diagonally-opposite end by the clip *g*, or by a bolt passing through the bars and catches. Each of the spring-catches is composed of a single piece of spring metal, having its ends bent upward, forming grips to be grasped by the hand when operating the catches, and having the middle portion deflected from a line passing through the extremities, as shown. By this construction the coupling is locked at each end when at the end of its movement in any one direction.

In practice the thill can be adjusted so as to occupy a position directly in front of the cutter or sleigh, and the sliding coupling can be adjusted to one end of the bars B and D and held in place by the catches; or it can be adjusted to any point intermediate the ends of the bars, as shown by dotted lines in Fig. 1. The position of the coupling shown by full lines, Fig. 1, causes the strain to come on one side of the cutter. The position of the coupling shown by dotted lines in said Fig. 1 distributes the strain more evenly, and any suitable catch may be provided to hold it in such position. The thill can be adjusted to the right or left of the cutter or sleigh, as desired, as shown by Figs. 2 and 3.

The sliding coupling forms a simple and efficient means for uniting the thill and cutter, and at the same time admits of the various adjustments.

Having thus described my invention, what

I claim, and desire to secure by Letters Patent, is—

1. The combination, with the cross-bar C and the thill, of the sliding coupling composed of the slides F, arranged at a distance apart, and the rod $f$, connecting them, interposed between the bar and thill, substantially as and for the purpose described.

2. The combination of the thill, the rod B, connected therewith, the rod D, adapted to be connected with the cutter or sleigh, and the sliding coupling uniting the rods, one of said rods having a rotary and longitudinal movement and the other rod having a longitudinal movement only relative to the sliding coupling, substantially as and for the purpose set forth.

3. The combination of the bar C, the rod D, connected therewith, the thill, the rod B, secured thereto, the sliding coupling, and the catch for holding the coupling in an adjusted position, substantially as described, and for the purpose specified.

4. The combination of the bar C, the rod D, the thill, the rod B, the sliding coupling extending about half the length of the rods, and the catches E and G, diagonally opposite each other and secured to the bar and thill, respectively, substantially as and for the purpose described.

In testimony whereof I affix my signature in presence of two witnesses.

JAMES G. RICHARDSON.

Witnesses:
C. W. McELWAIN,
H. DWELLE.